United States Patent
Al-Dahhan

(10) Patent No.: US 11,685,210 B2
(45) Date of Patent: Jun. 27, 2023

(54) JOUNCE BUMPER ASSEMBLY AND SUSPENSION SYSTEM

(71) Applicant: BASF Polyurethanes GmbH, Lemfoerde (DE)

(72) Inventor: Sadiq Al-Dahhan, Wyandotte, MI (US)

(73) Assignee: BASF Polyurethanes GmbH, Lemfoerde (DE)

( * ) Notice: Subject to any disclaimer, the term of this patent is extended or adjusted under 35 U.S.C. 154(b) by 0 days.

(21) Appl. No.: 17/904,397

(22) PCT Filed: Feb. 22, 2021

(86) PCT No.: PCT/EP2021/054333
§ 371 (c)(1),
(2) Date: Aug. 17, 2022

(87) PCT Pub. No.: WO2021/165535
PCT Pub. Date: Aug. 26, 2021

(65) Prior Publication Data
US 2023/0059439 A1      Feb. 23, 2023

(30) Foreign Application Priority Data

Feb. 20, 2020 (EP) .................................... 20158610

(51) Int. Cl.
*B60G 7/04* (2006.01)
*F16F 9/58* (2006.01)

(52) U.S. Cl.
CPC .................. *B60G 7/04* (2013.01); *F16F 9/58* (2013.01); *B60G 2204/45021* (2013.01); *B60G 2206/73* (2013.01)

(58) Field of Classification Search
CPC ............ B60G 7/04; B60G 2204/45021; B60G 2204/4502; B60G 206/73; F16F 9/58
See application file for complete search history.

(56) References Cited

U.S. PATENT DOCUMENTS

| 3,118,659 A | * | 1/1964 | Paulsen | .................... | B60G 7/04 |
|   |   |   |   |   | 267/35 |
| 9,545,829 B2 | * | 1/2017 | Al-Dahhan | ............ | B60G 11/22 |

(Continued)

FOREIGN PATENT DOCUMENTS

DE    102019218060 A1 *  5/2021
EP        2570276           3/2013

(Continued)

OTHER PUBLICATIONS

International Search Report dated Apr. 30, 2021, in International Patent Application No. PCT/EP2021/054333, 3 pages.

(Continued)

*Primary Examiner* — James A English
(74) *Attorney, Agent, or Firm* — Grüneberg and Myers PLLC

(57) ABSTRACT

A jounce bumper assembly can be used in a suspension system for an automotive vehicle. The assembly can contain a jounce bumper having a longitudinal axis, a bottom portion, and a tip portion spaced apart from the bottom portion in the axial direction, where the jounce bumper is resiliently deformable between an uncompressed basic state and an axially compressed state. The assembly can also contain a support member for supporting the jounce bumper, the support member having a wall section which can be arranged around the bottom portion and resiliently deformable with the jounce bumper in the axial and radial direction. The assembly can further contain at least one stiffening element associated to the wall section and configured to locally limit the radial deformation of the support member.

19 Claims, 4 Drawing Sheets

(56) References Cited

U.S. PATENT DOCUMENTS 10,208,823 B2 * 2/2019 Kashani ................ F16F 1/3615
10,920,843 B2 * 2/2021 Thye-Moormann .........................
                                                                          F16F 1/3713

FOREIGN PATENT DOCUMENTS

| KR | 10-1322426 B1 * | 10/2013 |
| WO | 2014/055596 | 4/2014 |
| WO | 2016/034567 | 3/2016 |

OTHER PUBLICATIONS

Written Opinion dated Apr. 30, 2021, in International Patent Application No. PCT/EP2021/054333, 5 pages.
International Preliminary Report on Patentability dated Sep. 1, 2022, in PCT/EP2021/054333, 7 pages.

* cited by examiner

JOUNCE BUMPER ASSEMBLY AND SUSPENSION SYSTEM

CROSS-REFERENCE TO RELATED APPLICATIONS

This application is the National Stage entry under § 371 of International Application No. PCT/EP2021/054333, filed on Feb. 22, 2021, and which claims the benefit of priority to EP Application No. 20158610.4, filed on Feb. 20, 2020. The content of each of these applications is hereby incorporated by reference in its entirety.

BACKGROUND OF THE INVENTION

Field of the Invention

The present invention relates to a jounce bumper assembly for use in a suspension system for an automotive vehicle and to a suspension system having such a jounce bumper.

Description of Related Art

It is known to provide a suspension system having a jounce bumper assembly of the aforementioned type for example within the chassis of an automotive vehicle. Such a jounce bumper assembly and in particular the jounce bumper is used, in particular, as vibration-damping spring element. In addition to the main shock absorber, which is frequently based on metal springs and/or pressurized gas elements, further spring elements as jounce bumpers are used as additional shock absorbers. These jounce bumpers are usually hollow bodies which are shaped concentrically and have different diameters and/or wall thicknesses along the spring axis. These jounce bumpers can basically also function as main shock absorbers, but they frequently assume an end stop function in combination with the main shock absorber.

A jounce bumper assembly having a jounce bumper for use in a suspension system of a vehicle is known from WO 2014055596 A1. The jounce bumper comprises an outer member having a base portion and a sidewall extending from said base portion, wherein the sidewall of the outer member is flexible relative to the base portion.

From WO 2016034567 A1, a spring aid assembly for a vehicle suspension system is known. The spring aid assembly includes: a housing having a generally cylindrical cavity formed therein, a damper including a rod extending through a cap, and a spring aid having a proximal end retained within the cavity of the housing, and a distal end extending in an axial direction away from the housing.

As the wheel assembly of the vehicle encounters road impact, the suspension system undergoes compression and extension strokes. During a large magnitude suspension event, such as the vehicle wheel running over an object in the road or traveling through a series of potholes, the jounce bumper may contact a stop in the vehicle body and elastically deform responsive to the force of the contact of the jounce bumper against the vehicle body. As elastic deformation increases, the force provided by the bumper also increases, increasing to a limit at which the bumper stops the relative movement of the wheel assembly toward the vehicle body.

At a large compression, a highly progressive nonlinear stiffness rate is typically developed by the jounce bumper. This is undesirable for load management and gives rise to high peak strut loads, particularly as a result of potholes in the road surface. These high peak loads may limit design choices in wheel size and unsprung mass, both of which can result in increases in the load that passes through the jounce bumper, all else being equal. Otherwise, increased unsprung mass and wheel size could require costly structural reinforcements to the strut upper mount vehicle structure. Standard jounce bumpers can also generate undesirable ride characteristics as a result of their highly progressive rates. The response of the vehicle suspension system to a very stiff or progressive rate is often characterized as harsh or lacking in good energy management.

SUMMARY OF THE INVENTION

As a result, it is desirable to provide a new jounce bumper assembly for a suspension system of a vehicle that avoids force overload in a jounce bumper. It is further desirable to provide a jounce bumper assembly for a suspension system of a vehicle that provides a low cost solution for greatly enhancing peak load performance of a jounce bumper. The invention was consequently based on the object of avoiding overload in a jounce bumper and accordingly the failure of the jounce bumper due to overload. In particular, the invention was based on the object of providing a low cost solution for greatly enhancing peak load performance of a jounce bumper.

In one aspect, the invention suggests a jounce bumper assembly of the type mentioned at the beginning, wherein the jounce bumper assembly for use in a suspension system for an automotive vehicle comprises a jounce bumper having a longitudinal axis, a bottom portion and a tip portion spaced apart from the bottom portion in the axial direction, wherein the jounce bumper is resiliently deformable between an uncompressed basic state and an axially compressed state of the longitudinal axis, a support member for supporting the jounce bumper, the support member having a wall section which is arranged around the bottom portion and resiliently deformable with the jounce bumper in the axial and radial direction, and at least one stiffening element associated to the wall section and configured to locally limit the radial deformation of the support member, wherein a recess provided at the base portion of the support member being configured to receive the jounce bumper when it is maximally compressed. Thus, when the loads acting on the wall section by the radially expanding jounce bumper exceeds a maximum, the support member will be deformed together with the jounce bumper. In order to avoid that the support member deflects radially over its entire axial extension, the stiffening member locally limits the radial deformation of the support member. Thus, even in case of a high radial deformation of the wall section, at least a region having a constant or close to constant radial expansion is provided for introducing or transmitting the forces into the jounce bumper assembly.

DETAILED DESCRIPTION OF THE INVENTION

Figure 1:
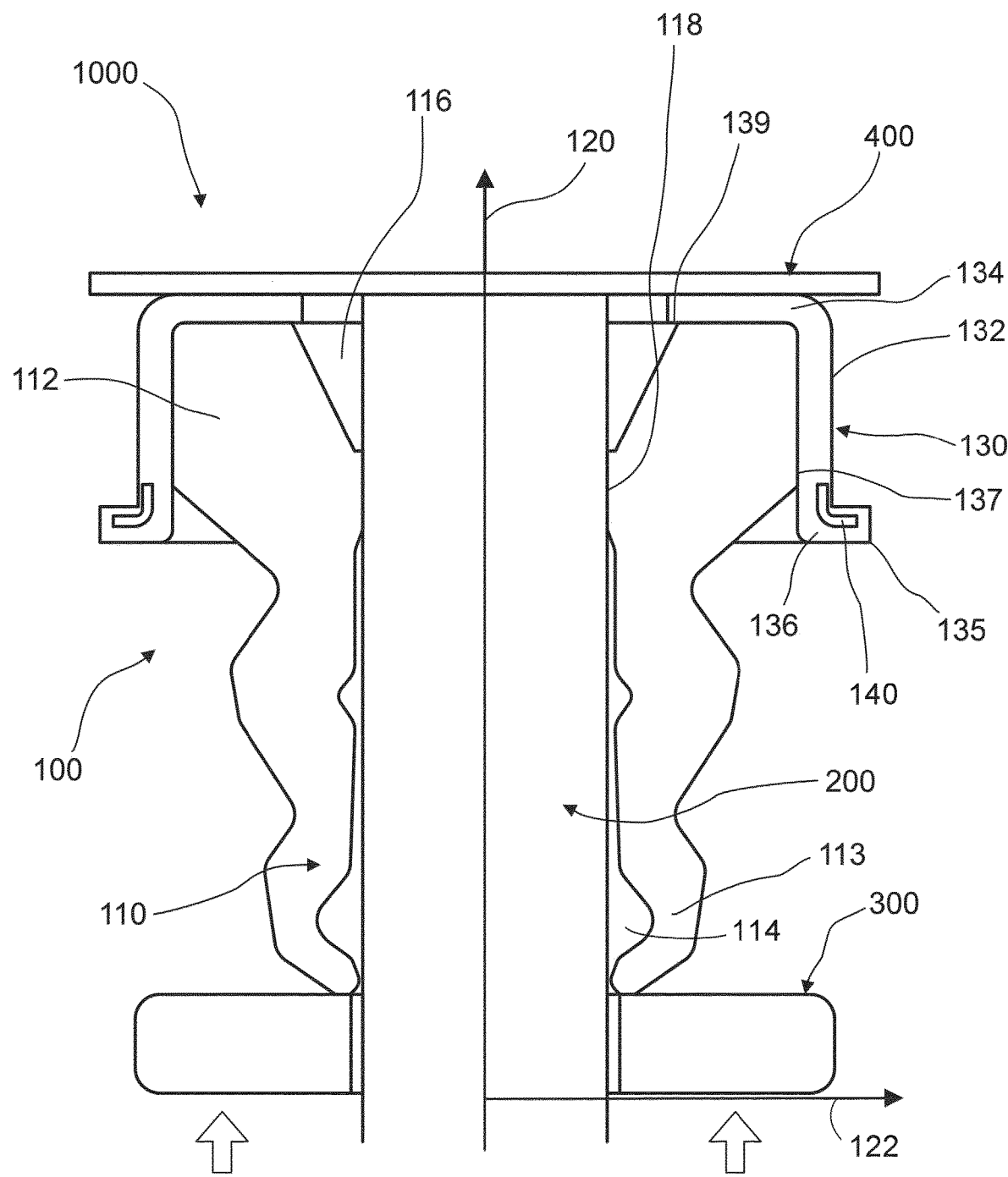
FIG. 1 shows a cross-sectional view through a suspension system according to a preferred exemplary embodiment in an uncompressed state.

A jounce bumper assembly is suggested wherein the wall section of the support member has a rim portion and the stiffening element is arranged proximal to the rim portion, wherein the support member has a stop shoulder extending radial inwardly and/or radial outwardly from the rim portion, and wherein the stiffening element has a sleeve portion extending in the axial direction, in particular circumferentially around the jounce bumper and/or the wall section, and a stop portion extending parallel to the stop shoulder.

It will be understood that such a stiffening element has an increased stiffness compared to the wall section, which is resiliently deformable with the jounce bumper. The stiffening element therefore a limits radial deformation in the region of the support member or wall section which the at least one stiffening element is associated with.

Further, it will be understood, that depending on the form of the jounce bumper, the axial direction can be defined respectively by a longitudinal direction of the jounce bumper and the radial direction can be respectively defined by the transversal direction to said longitudinal direction.

In a preferred embodiment, the support member has a base portion extending in radial direction, and the wall portion extends circumferentially around the base portion, and wherein the stiffening element is spaced apart from the base portion in the axial direction. By arranging the stiffening element at a distance to the base portion, the wall section between the stiffening element and the base portion can be axially and radially deformed together with the jounce bumper.

Preferably, the axial extension of the wall section is larger than the axial extension of the stiffening element. By suggesting that the wall section has a larger axial extension than the stiffening element, a sufficiently large part of the wall section is provided that can still be resiliently deformed together with the jounce bumper in the axial and in the radial direction.

In a further preferred embodiment, the jounce bumper is received in the support member such that the jounce bumper is, at least along parts of its circumference, preferably along its entire circumference, in contact with the wall section in the uncompressed state of the jounce bumper. It will be understood that the jounce bumper is preferably along its entire circumference in contact with the wall section in the compressed state of the jounce bumper. When axial loads are applied on the jounce bumper, the energy absorption is firstly dominated by axial compression of the jounce bumper before a radial expansion of the bottom portion of the jounce bumper will also absorb energy. This ensures a smooth energy absorption resulting in better vehicle handling.

Preferably, the bottom portion is cylindrical or part-cylindrical and the wall section is formed correspondingly to the bottom portion. By suggesting a cylindrical or part-cylindrical formed bottom section, the forces acting on the wall section and the bottom portion are evenly distributed along the whole circumference.

The wall section of the support member has a rim portion and the stiffening element is arranged proximal to the rim portion. It will be understood that the wall section has an axial extension having a height starting from the bottom portion, wherein the height H is defining the maximum height of the wall section that is reached at the rim portion. Therefore, the stiffening element being arranged proximal to the rim portion is arranged at a position x along the longitudinal axis, wherein $x \leq 2/3$ H, preferably $x \leq 9/10$ H. Thus, the stiffening element defines a stop for introducing axial forces to the wall section to which the stiffening element is associated.

The support member has a stop shoulder extending radially inwards and/or radially outwards from the rim portion. By providing a stop shoulder extending from the rim portion, the support member provides an increased surface for introducing axial forces into the jounce bumper assembly.

The stiffening element has a sleeve portion extending in the axial direction, in particular, circumferentially around the jounce bumper and/or the wall section, and a stop portion extending parallel to the stop shoulder. By having a sleeve portion, the stiffening element sufficiently limits the radial deformation of the wall section. Further, by having a stop portion extending parallel to the stop shoulder, an increased surface is provided for introducing axial forces into the stiffening element, wherein the stiffening element is transmitting these forces evenly to the support member.

Preferably, the stiffening element is arranged at least partly circumferentially around the wall section. By arranging the stiffening element around the wall section the radial deformation can be sufficiently limited and the manufacturing process is simplified.

In a particularly preferred embodiment, the stiffening element is integrally formed with the wall section, and is preferably at least partly enclosed by the wall section. By having the stiffening element and the support member formed as an integral part, the assembling process is simplified and the stiffening element is protected against environmental influences. at a wrong position is avoided. Thus, the risk of accidental failure due to cracks induced by corrosion and wear is avoided.

Preferably, the stiffening element comprises or consists of a high strength material, preferably steel. The invention advantageously recognizes that the stiffening element made of high strength material can sufficiently limit the radial deformation of the support member and jounce bumper by at the same time having a reduced axial extension. Thus, as the axial extension of the stiffening element is reduced, the portion of a wall section being axially and radially deformable together with the jounce bumper is increased and the energy absorption is thereby improved.

Preferably, the base material of the wall section comprises or consists of a material having a higher stiffness than the jounce bumper. The invention advantageously recognizes that by suggesting a support member which is arranged around the bottom portion and resiliently deformable with the jounce bumper, a highly progressive compression behaviour of the jounce bumper assembly is ensured, as the support member increases the rigidity of the jounce bumper when the compression, for example, reaches high peak loads. As the wall section is radially and axially deformable together with the jounce bumper, extremely high energy can be absorbed.

Further preferred, the base material of the wall section comprises or consists of an elastomer, preferably a thermoplastic polyurethane. An elastomer and especially a thermoplastic polyurethane provides a sufficiently high stiffness and corrosion wear resistance while at the same time being resiliently deformable.

In preferred embodiments, the jounce bumper comprises or consists of an elastomer, preferably of a volume compressible elastomer, in particular on the basis of a polyisocyanate polyaddition product, in particular a micro cellular urethane.

A jounce bumper here can be composed of an elastomer, but it can also be composed of a plurality of elastomers which are present in layers, in shell form or in another form or also in a mixture with one another. The polyisocyanate polyaddition products are preferably constructed on the basis of microcellular polyurethane elastomers, on the basis of thermoplastic polyurethane or from combinations of said two materials which may optionally comprise polyurea structures.

Microcellular polyurethane elastomers which, in a preferred embodiment, have a density according to DIN 53420 of 200 kg/m$^3$ to 1100 kg/m$^3$, preferably 300 kg/m$^3$ to 800 kg/m$^3$, a tensile strength according to DIN 53571 of 2 N/mm$^2$, preferably 2 N/mm$^2$ to 8 N/mm$^2$, an elongation according to DIN 53571 of 300%, preferably 300% to 700%, and a tear strength according to DIN 53515 of preferably 8 N/mm to 25 N/mm are particularly preferred.

The elastomers are preferably microcellular elastomers on the basis of polyisocyanate polyaddition products, preferably having cells with a diameter of 0.01 mm to 0.5 mm, particularly preferably 0.01 to 0.15 mm.

Elastomers on the basis of polyisocyanate polyaddition products and the production thereof are known in general and described numerously, for example in EP-A 62 835, EP-A 36 994, EP-A 250 969, DE-A 195 48 770 and DE-A 195 48 771.

Production customarily takes place by reacting isocyanates with compounds which are reactive to isocyanates.

The elastomers on the basis of cellular polyisocyanate polyaddition products are customarily produced in a mold in which the reactive starting components are reacted with one another. Suitable molds here are generally customary molds, for example metal molds, which, on the basis of their shape, ensure the three-dimensional shape according to the invention of the spring element. In one embodiment, the contour elements are integrated directly in the casting mold; in a further embodiment, they are retrospectively incorporated into the concentric basic body. In a preferred embodiment, the concentric spring element is cooled for this purpose until it solidifies, preferably with liquid nitrogen, and processed in this state.

The polyisocyanate polyaddition products can be produced according to generally known methods, for example by the following starting substances being used in a single or two-stage process:
(a) isocyanate,
(b) compounds reactive to isocyanates,
(c) water and optionally
(d) catalysts,
(e) blowing agents and/or
(f) auxiliary and/or additional substances, for example polysiloxanes and/or fatty acid sulfonates.

The surface temperature of the inner wall of the mold is customarily 40° C. to 95° C., preferably 50° C. to 90° C. The production of the molded parts is advantageously carried out at an NCO/OH ratio of 0.85 to 1.20, wherein the heated starting components are mixed and brought in a quantity corresponding to the desired molded part density into a heated, preferably tightly closing molding tool. The molded parts are cured for 5 minutes to 60 minutes and then can be removed from the mold. The quantity of the reaction mixture introduced into the molding tool is customarily dimensioned in such a manner that the molded bodies obtained have the density already presented. The starting components are customarily introduced into the molding tool at a temperature of 15° C. to 120° C., preferably of 30° C. to 110° C. The degrees of compression for producing the molded bodies lie between 1.1 and 8, preferably between 2 and 6. The cellular polyisocyanate polyaddition products are expediently produced according to the "one shot" method with the aid of high-pressure technology, low-pressure technology or in particular reaction injection molding technology (RIM) in open or preferably closed molding tools. The reaction is carried out in particular by compression in a closed molding tool. The reaction injection molding technology is described, for example, by H. Piechota and H. Rohr in "Integralschaumstoffe", Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76-84.

The invention has herein above been described in a first aspect will respect to a jounce bumper assembly.

In a second aspect, the invention also relates suspension system for an automotive vehicle, comprising: a piston rod extending in axial direction and being operatively coupled to the vehicle, a striker extending in radial direction and being movable in axial direction to compress the jounce bumper axially along the piston rod, a jounce bumper assembly coaxially mounted to the piston rod and being configured for absorbing loads the axial direction.

According to the second aspect, the invention achieves the initially mentioned object by suggesting that the jounce bumper is formed in accordance with one of the preferred embodiments mentioned hereinabove under the first aspect. The benefits and preferred embodiments of the jounce bumper assembly of the first aspect as described above are also the benefits and preferred embodiments of the suspension system and vice versa.

Figure 2:
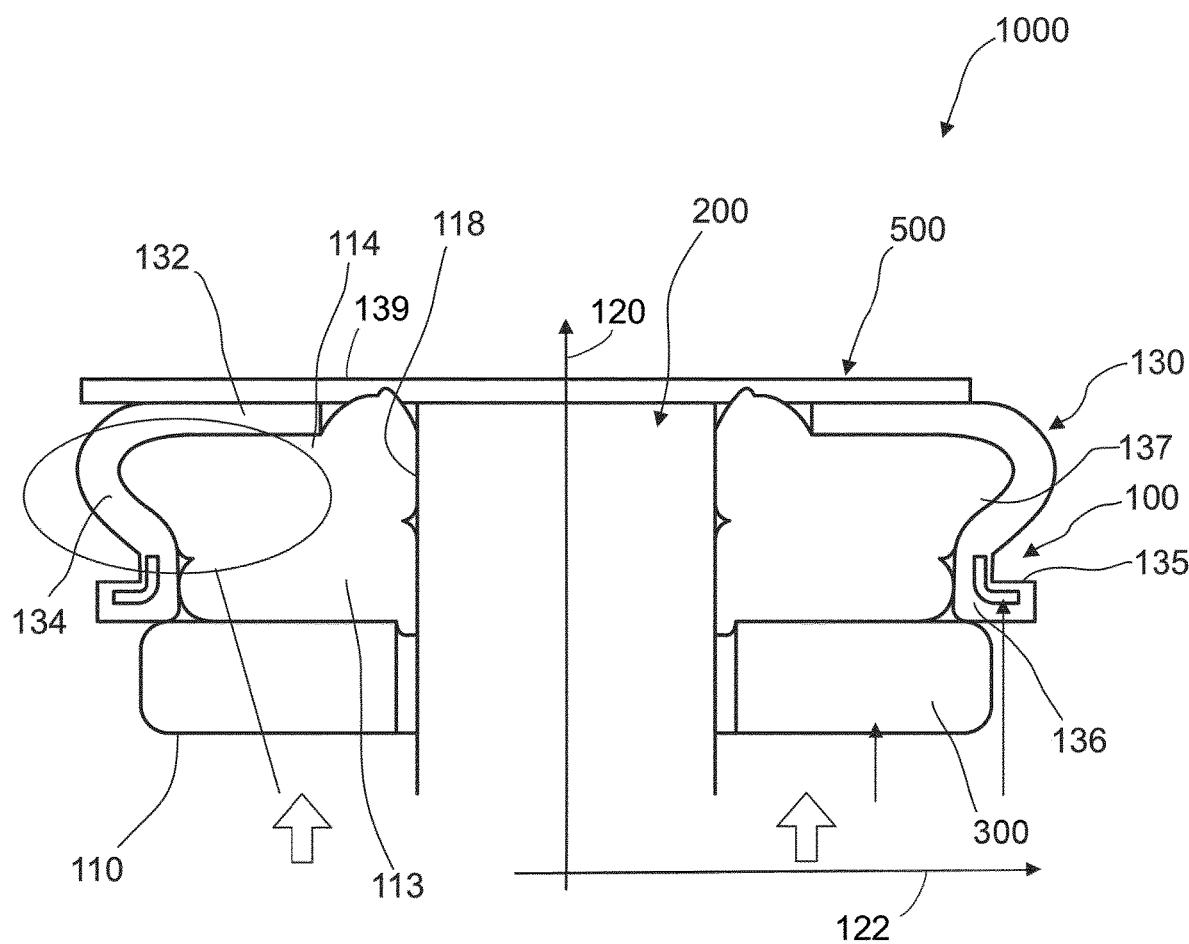
FIG. 2 shows a cross-sectional view through the suspension system according to FIG. 1 in a compressed state.
Figure 3:
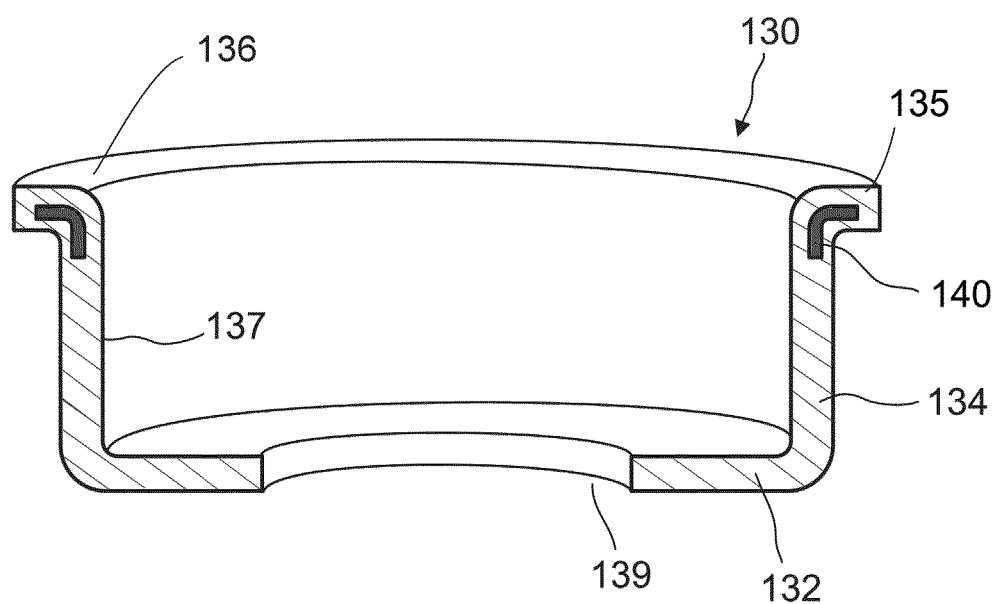
FIG. 3 shows a cross-sectional view through a support member according to a preferred exemplary embodiment.
Figure 4:
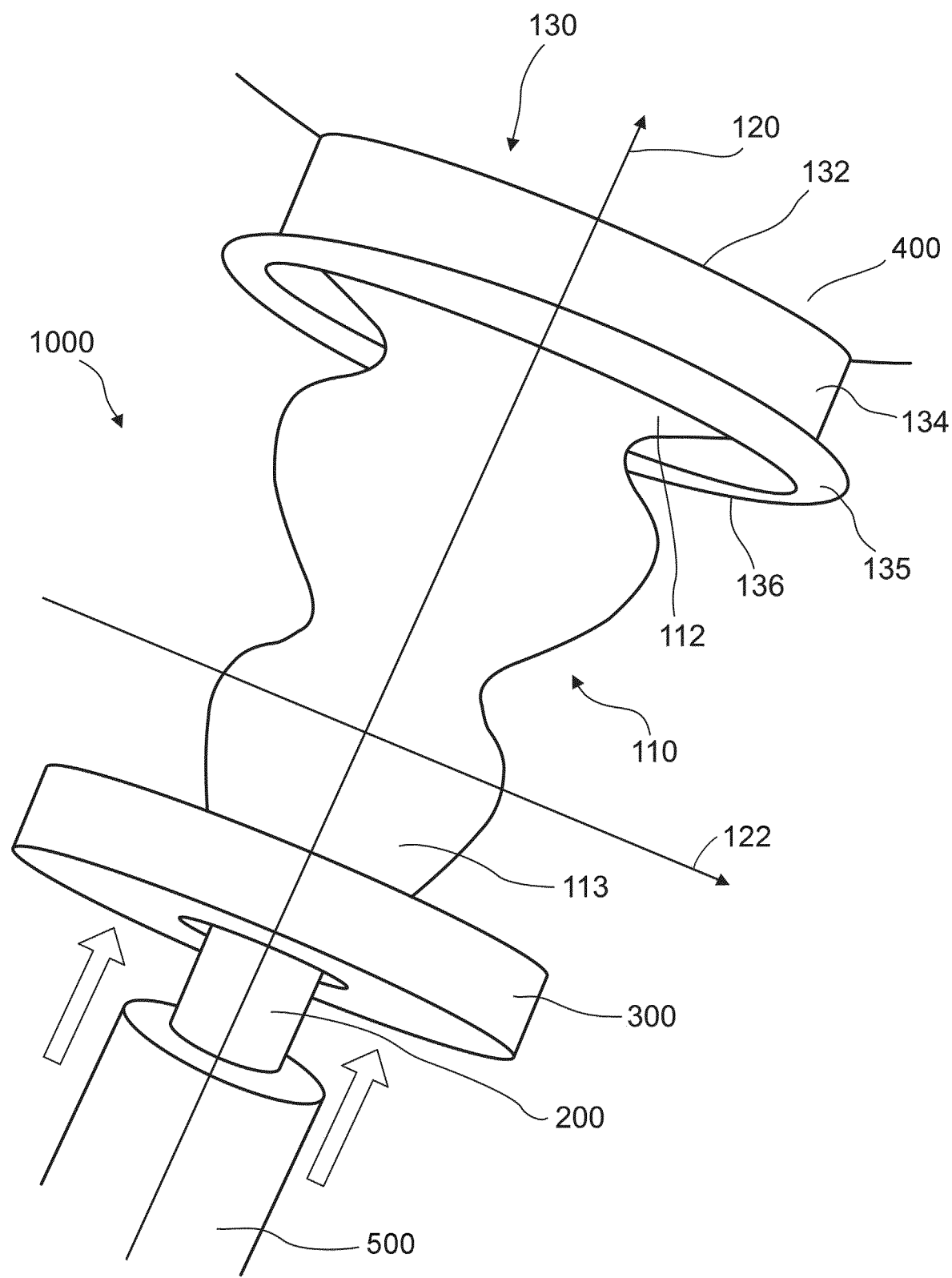
FIG. 4 shows a schematic spatial illustration of the suspension system according to FIG. 1.

The invention is described below using a preferred example with reference to the attached figures, in which:

FIG. 1 shows a cross-sectional view through a suspension system according to a preferred exemplary embodiment in an uncompressed state, FIG. 2 shows a cross-sectional view through the suspension system according to FIG. 1 in a compressed state, FIG. 3 shows a cross-sectional view through a support member according to a preferred exemplary embodiment, FIG. 4 shows a schematic spatial illustration of the suspension system according to FIG. 1.

Firstly, FIG. 1 illustrates a suspension system 1000 according to a preferred exemplary embodiment of the invention. The suspension system 1000 has a jounce bumper assembly 100, a piston rod 200 and a striker 300. The jounce bumper assembly 100 is coaxially mounted to the piston rod 200. The striker 300 is movably mounted to the piston rod and configured to compress the jounce bumper assembly 100 along the piston rod 200. The jounce bumper assembly 100 is mounted against a vehicle body 400.

The jounce bumper assembly 100 comprises a jounce bumper 110, an axial direction 120, wherein the jounce bumper 100 is extending in axial direction, a support member 130 and a stiffening element 140 associated to the support member 130.

The jounce bumper 110 is partially or completely composed of an elastomer, preferably of a rubber of a polyisocyanate polyaddition product such as, for example, a PUR foam.

The jounce bumper 110 has an essentially truncated-cone-shape lateral surface on the outside. The jounce bumper 110 has a cylindrically formed bottom portion 112 and a tip portion 113 spaced apart from the bottom portion 112 in the axial direction 120.

Further, the jounce bumper 110 has a number of recesses 114, 116 provided adjacent to an inner central circular aperture 118. The recesses 114, 116 remain as long as the jounce bumper 110 is in the uncompressed basic state (shown in FIG. 1). The central circular aperture 118 provides a passage for the piston rod 200 so that the jounce bumper 110 can be compressed axially along the piston rod 200 as the striker 300 contacts and compresses the jounce bumper 110 at the tip portion 113.

The support member 130 has a wall section 132 which is arranged around the bottom portion 112 and resiliently deformable with the jounce bumper 110 in the axial direction 120 and in the radial direction 122. The wall section 132 is extending in axial direction 120. The support member 130 further comprises a base portion 134 extending in transversal direction or respectively radial direction 122, wherein the wall section 132 extends circumferentially around the base portion 134.

The support member 130 and in particular the wall section 132 being circumferentially arranged around the base portion 134 defining a cup-form of support member 130. The support member 130 further comprises a stop shoulder 135 provided at a rim portion 136. The rim portion 136 is arranged opposite to the base portion 134 in axial direction 120.

The stop shoulder 135, according the embodiment illustrated in FIG. 1, is extending radially outwards such that the stop shoulder 135 defines a flange. The stop shoulder 135 is extending parallel to the striker 300 such that the stop shoulder can be in contact with the striker 300 to introduce axial loads into the support member 130.

The jounce bumper 110 is received in the support member 130 such that the jounce bumper 110 is along its circumference in contact with an inner surface 137 of the wall section 132 in the uncompressed state of the jounce bumper 110 shown in FIG. 1.

The stiffening element 140 is associated to the wall section 132 of the support member 130 and according to the present embodiment integrally formed with the support member 130 and in particular the wall section 132 of the support member 130.

The stiffening element 140 has a sleeve portion 142 extending in the axial direction 120 circumferentially around the jounce bumper 110 and the wall section 132. The stiffening element 140 further has a stop portion 144 extending parallel to the stop shoulder 135 and also parallel to the striker 300.

The sleeve portion 142 is arranged circumferentially outside the wall section 132, wherein the stop portion 144 is integrally formed with the stop shoulder 135 such that the stop portion 144 is enclosed by the stop shoulder 135.

Axial extension of the wall section 132 is larger than the axial extension of the stiffening element 140 and, in particular, of the sleeve portion 142.

FIG. 2 illustrates the suspension system according to FIG. 1 in an axially compressed state of the jounce bumper assembly 100.

As apparent from FIG. 2, the support member 130, in particular, the wall section 132 has a portion between the bottom portion 134 and the stiffening element 140 that is resiliently deformable with a jounce bumper 110 in the axial direction 120 and in the radial direction 122.

The deformation of the wall section 132 and the jounce bumper 110 is locally limited by the stiffening element 140. As the radial deformation of the rim portion 136 and the stop shoulder 135 is limited by the stiffening element 140, the wall section 132 and consequently the jounce bumper 110 can only radially expand in a predefined value, thereby avoiding an overload on the jounce bumper 110 resulting in an undesired transfer of shock energy into the suspension system and the vehicle causing a reduced lifetime.

The stiffening element 140 and the adjacent parts of the support member 130 provide a stop shoulder for introducing axial loads to the support element 130.

According to the embodiment, shown in FIG. 1, the radial deformation of the rim portion 136 and the stop shoulder 135 is limited by the stiffening element 140. As a result, axial loads can sufficiently be introduced in the stop shoulder 135 of the support member 130 as the deflection of the wall section 132 and consequently the stop shoulder 135 is avoided.

The recesses 114, 116 provided at the jounce bumper 110 are suppressed or displaced in the compressed state of the jounce bumper 110.

As shown in FIGS. 1 and 2, the support member 130 defines a central circular aperture and the jounce bumper 110 defines a corresponding central circular aperture 118. The central apertures allow for passage of the piston rod 200 of the suspension system 1000 so that the jounce bumper 110 can be compressed axially along the piston rod 200 as a striker 300 contacts and compresses the tip portion 113 of the jounce bumper 110. The striker 300 compresses the jounce bumper 110 along the axial direction 120

A more detailed cross-sectional view of the support member 130 is given in FIG. 3. The support member 130 is integrally formed with the stiffening element 140 such that the stiffening element 140 is completely surrounded by the support element 114 and in particular by the rim portion 136 and the flange portion 135 of the support element 140.

Finally, FIG. 4 illustrates a schematic spatial view of the suspension system 1000. In operation, as an impact supplied to the suspension system 1000, a striker 300 compresses the jounce bumper assembly 100 and causes the jounce bumper 110 to compress axially and expand radially against the wall section 132 of the support member 130. Because the wall section 132 is at least partly formed of a resiliently deformable material, the support member 140 is deformed together with the jounce bumper 110 and expands radially, thereby providing a smoother ride for the occupants in the vehicle.

At the same time, because the support member 130 and, in particular, the stiffening element 140, are preferably stiffer than the jounce bumper 110 and have a smaller range of deformation/radial expansion than the jounce bumper 110, the support member 140 and the associated stiffening element 130 increase the spring rate of the jounce bumper assembly 100.

REFERENCE SIGNS 100 jounce bumper assembly
110 jounce bumper
112 bottom portion
113 tip portion
114 recess
116 recess
118 central circular aperture
120 axial direction
122 radial direction
130 support member
132 wall section
134 base portion
135 stop shoulder
136 rim portion
137 inner sidewall
139 central circular aperture
140 stiffening element
142 sleeve portion
144 stop portion 200 piston rod
300 striker
400 vehicle
500 strut system
1000 suspension system

The invention claimed is:

1. A jounce bumper assembly for use in a suspension system for an automotive vehicle, comprising:
a jounce bumper having a longitudinal axis, a bottom portion, and a tip portion spaced apart from the bottom portion in an axial direction, wherein the jounce bumper is resiliently deformable between an uncompressed basic state and an axially compressed state,
a support member for supporting the jounce bumper, the support member having a wall section which is arranged around the bottom portion, wherein the support member is resiliently deformable with the jounce bumper in the axial direction and a radial direction, and
at least one stiffening element associated to the wall section and configured to locally limit a radial deformation of the support member,
wherein the wall section of the support member has a rim portion, and the at least one stiffening element is arranged proximal to the rim portion,
wherein the support member has a stop shoulder extending radial inwardly and/or radial outwardly from the rim portion, and
wherein the at least one stiffening element has a sleeve portion extending in the axial direction and a stop portion extending parallel to the stop shoulder.

2. The jounce bumper assembly according to claim 1, wherein the support member has a base portion extending in the radial direction, and the wall section extends circumferentially around the base portion, and
wherein the at least one stiffening element is arranged spaced apart from the base portion in the axial direction.

3. The jounce bumper assembly according to claim 2, wherein an axial extension of the wall section is larger than an axial extension of the at least one stiffening element.

4. The jounce bumper assembly according to claim 1, wherein the jounce bumper is received in the support member such that the jounce bumper is at least along parts of its circumference, in contact with the wall section the uncompressed state of the jounce bumper.

5. The jounce bumper assembly according to claim 1, wherein the bottom portion is cylindrical or part-cylindrical and the wall section is formed correspondingly to the bottom portion.

6. The jounce bumper assembly according to claim 1, wherein the at least one stiffening element is at least partly arranged circumferentially around the wall section.

7. The jounce bumper assembly according to claim 1, wherein the at least one stiffening element is integrally formed with the wall section.

8. The jounce bumper assembly according to claim 1, wherein the at least one stiffening element comprises or consists of a high strength material.

9. The jounce bumper assembly according to claim 1, wherein a base material of the wall section comprises or consists of a material having a higher stiffness than the jounce bumper.

10. The jounce bumper assembly according to claim 1, wherein a base material of the wall section comprises or consists of an elastomer.

11. The jounce bumper assembly according to claim 1, wherein the jounce bumper comprises or consists of an elastomer.

12. A suspension system for an automotive vehicle, comprising:
a piston rod extending in the axial direction and operatively coupled to the vehicle,
a striker extending in the radial direction and movable in the axial direction to compress the jounce hamper axially along the piston rod, and
the jounce bumper assembly according to claim 1, coaxially mounted to the piston rod and configured for absorbing loads in the axial direction.

13. The jounce bumper assembly according to claim 1, wherein the sleeve portion extends circumferentially around the jounce bumper and/or the wall section.

14. The jounce bumper assembly according to claim 4, wherein the jounce bumper is along its circumference in contact with the wall section in the uncompressed state of the jounce bumper.

15. The jounce bumper assembly according to claim 7, wherein the at least one stiffening element is at least partly enclosed by the wall section.

16. The jounce bumper assembly according to claim 8, wherein the high strength material is steel.

17. The jounce bumper assembly according to claim 10, wherein the elastomer is thermoplastic polyurethane.

18. The jounce bumper assembly according to claim 11, wherein the elastomer is a rubber and/or a polyisocyanate polyaddition product.

19. The jounce bumper assembly according to claim 11, wherein the elastomer is a micro cellular urethane.

* * * * *